Patented June 23, 1936

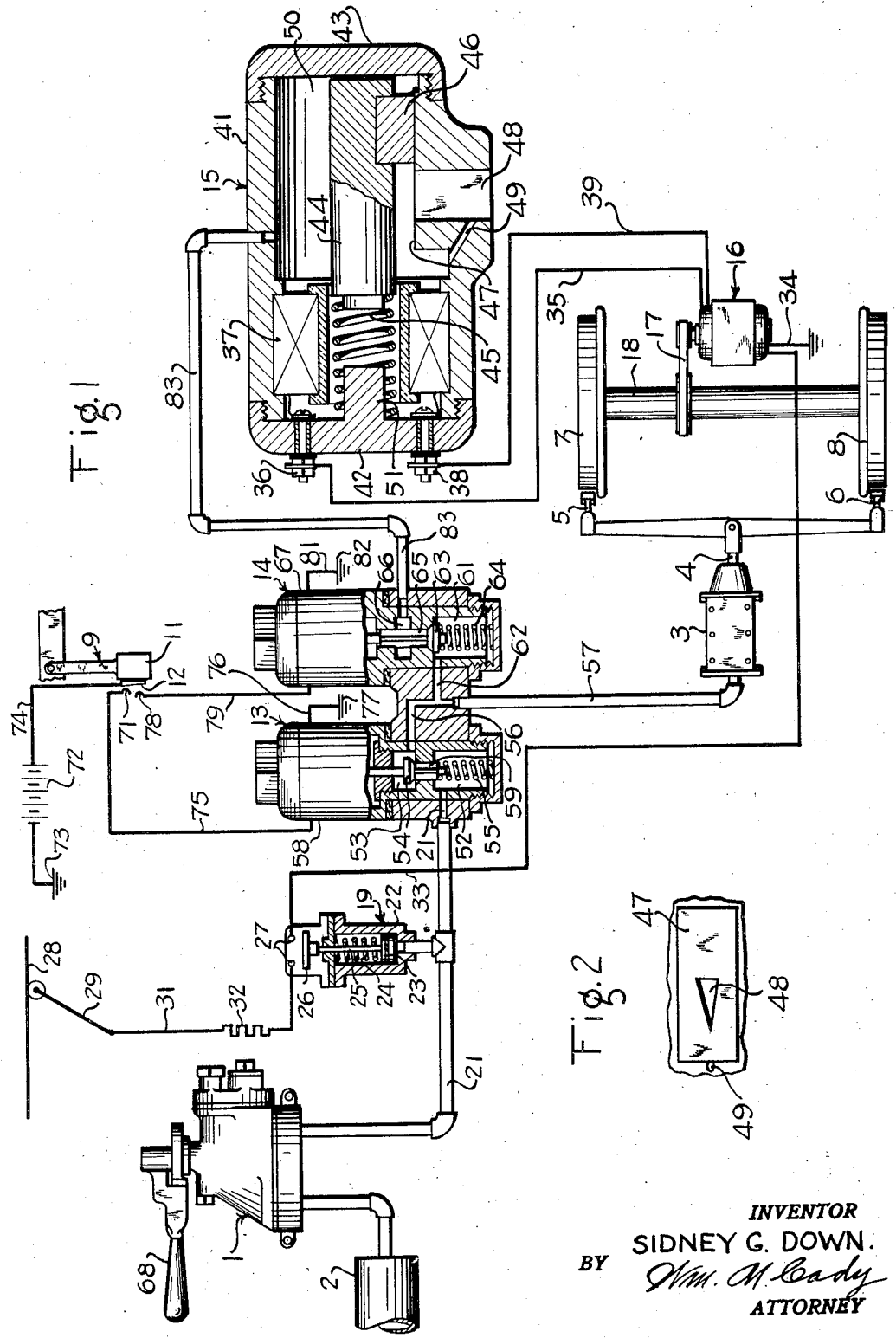

2,045,181

UNITED STATES PATENT OFFICE 2,045,181

BRAKE CONTROLLING DEVICE

Sidney G. Down, Edgewood, Pa., assignor to The Westinghouse Air Brake Company, Wilmerding, Pa., a corporation of Pennsylvania Application May 3, 1934, Serial No. 723,679

8 Claims. (Cl. 303—21)

My invention relates to controlling devices for vehicle brakes and more particularly to means for controlling the rate of release of such brakes under various conditions of operation.

In vehicles employing friction brakes, it is well known that for a given braking pressure such brakes are less effective in retarding the motion of a vehicle at high speeds than at low speeds, because the coefficient of friction between the rubbing parts is lower at high speeds than at low speeds. In order to bring a vehicle to a stop quickly it has been the usual practice for an operator to apply the brakes with a high degree of braking pressure at high speed, and, as the speed of the vehicle decreases, to reduce the braking pressure at such a rate that the vehicle is brought to a stop quickly and smoothly without dangerous shock, or skidding of the wheels.

Because of the difficulty of properly reducing the braking pressure at the desired rate it becomes desirable, in many installations to provide a retardation controller for regulating the degree of application of the brakes. This may comprise an inertia responsive device, such as a pendulum that assumes various positions in accordance with variations in the deceleration of the vehicle, and is adapted, by means of electric circuits, or otherwise, to control the degree of application of the brakes.

If a retardation controller is provided as above described, and is employed to control the operation of a valve for venting fluid under pressure from the brake cylinder, such venting valve will ordinarily completely open or close the passage through it. The fixed discharge orifice provided in such valves must be of sufficient size to permit the discharge of air from the brake cylinder at the maximum rate required. It is necessary to discharge air from the brake cylinder more promptly at low car speeds than at high car speeds in order to prevent slipping of the car wheels on the rails. Consequently, it is necessary that the size of the orifice in the pressure release controlling valve be sufficient to provide for the required low speed rate of brake release.

In the operation of a release controlling valve of such capacity, while the vehicle is traveling at higher speeds, it frequently happens that too much air is vented to the atmosphere, thus releasing the brakes more than the desired amount for that particular vehicle speed, and requiring a reapplication of the brakes to be made to produce the desired braking force.

The repeating occurrence of this phenomena effects too great an application of the brake pressure followed by too great a release of the brakes, thus producing a pumping action in the operation of the brake control valve with consequent waste of air from the control chamber.

In accordance with my invention, means is provided for preventing rapid variations from a desired value in the setting of the brakes by varying the size of the opening through which air is vented to release the fluid pressure brake in accordance with the rate of operation of the vehicle, the effective size of the venting port being smaller for higher speeds of operation of the vehicle than for lower speeds thereof.

It is a general object of my invention to provide for automatically controlling the rate of release of a brake, effected by the operation of a retardation controlling device, in accordance with the speed of operation of the vehicle being braked.

It is a more specific object of my invention to provide for controlling the degree of application and release of a brake by a retardation controlling device, and for controlling the rate of release in accordance with the speed of the vehicle to avoid "pumping action" of the brake controlling mechanism.

Other objects and advantages of my invention will be apparent from the following description when taken in connection with the attached drawing, in which:

Fig. 1 is a diagrammatic view of circuits and apparatus comprising one preferred embodiment of my invention and Fig. 2 is a view of the slide valve seat.

Referring to the drawing, a brake valve 1 is provided for controlling the supply of air from a reservoir 2 to the brake cylinder 3 for applying the brake shoes 5 and 6 to the wheels 7 and 8, respectively, of a vehicle in accordance with the principle of operation of the well known direct pressure type fluid pressure brakes. The brake valve 1 may be of any suitable construction, such, for example, as described and illustrated in application of David W. Lloyd for Safety car equipment, Serial No. 698,242, filed November 16, 1933, and assigned to the same assignee as this application.

Upon application of the fluid pressure brakes by operation of the brake valve 1 and retention of this valve in its application position, the retardation controller 9, comprising an inertia responsive element such as the pendulum 11, becomes effective to control the operation of the application magnet valve 13 and the release magnet valve 14 for controlling the pressure in the brake cylinder 3 to prevent its becoming higher than an amount corresponding to a desired rate of deceleration determined by the inertia device 9. The rate of release of air pressure from the brake cylinder through release magnet valve 14 is determined by a speed responsive slide valve 15. The slide valve 15 is controlled by a tachometer generator 16, that is operated by a belt 17 from the shaft 18 that revolves in accordance with the speed of the vehicle wheels 7 and 8. The energization of the field winding of the generator 16 is controlled by a pneumatic switch 19 that is in a circuit closing position when pressure exists in the straight air pipe 21.

The pressure switch 19 comprises a cylinder 22 containing a piston 23 that is normally biased to its illustrated or lower position by a spring member 24 and is adapted to be moved upwardly against the pressure of the spring by air under pressure from the pipe 21. When actuated to its upper position the piston 23 operates a rod 25 bringing a contact member 26 into engagement with contact members 27, thus closing the field winding circuit of the generator 16. This field winding circuit extends from the conductor 28 through trolley 29, conductor 31, resistor 32, the switch contact members 26 and 27, conductor 33 to the field winding of the generator 16, and by conductor 34 to ground. In order to provide that the excitation of the tachometer generator 16 may be maintained constant independently of the slight variation in voltage that may occur between the overhead conductor 28 and ground the magnetic core structure of the generator field may be saturated. The voltage and current output of the generator 16 will, under these conditions, be proportional to the speed at which the generator operates, that is, proportional to the speed of the wheels 7 and 8. This output circuit extends from the generator 16, through conductor 35 to the terminal 36 of the slide valve magnet, through winding 37 of the magnet to the terminal 38, and by conductor 39 back to the armature of the generator 16.

The slide valve mechanism 15 comprises a body having a cylindrical wall 41 and end walls 42 and 43 which together provide a casing for enclosing the electromagnet coil 37 and a plunger core 44 that is attracted by the coil against the bias of a spring 45 which normally presses the core to the right, or to its illustrated position. A slide valve 46 is movably attached to the core 44 and slides along the valve seat 47 for closing the port 48 which may be triangular in shape as best shown in Fig. 2. A by-pass port 49 is provided for permitting a small amount of air to pass around the port 48 when this port is closed by the valve 46. A stop 51 is provided for engaging the end of the core 44 when it has moved to the left an amount sufficient to completely close the port 48, thus preventing it from opening at the right side of the valve. It is intended that the magnet valve have a characteristic such that the position of the core 44 and the valve 46 will be a function of the energization of the coil 37. It is, therefore, desirable that the casing structure or at least the end portions 42 and 43 thereof be made of non-magnetic material or that the casing structure be sufficiently remote from the flux produced by the coil 37 as substantially to be ineffective in controlling the flux that enters the core 44.

The application magnet control device 13 comprises a chamber 52 supplied through inlet port and pipe 21 and a valve chamber 53 containing a valve 54 that is normally biased to its upper or unseated position by a spring 55. An outlet port 56 connects the valve chamber 53 with the brake cylinder pipe 57. A magnet coil 58 is provided which, when energized, forces the valve 54 downwardly against its seat thus closing the port 59 between the pressure chamber 52 and the valve chamber 53.

The release magnet control device 14 comprises a lower valve chamber 61 having an inlet port 62 that communicates with the port 56 and with the brake cylinder pipe 57, and contains a valve 63 that is normally biased upwardly to its seated position by a spring member 64, causing the valve to close a port 65 that leads upwardly to a chamber 66. An operating coil 67 is provided which, when energized, forces the valve 63 downwardly to open the port 65.

When the motorman wishes to apply the brakes the handle 68 of the brake valve 1 is moved to its appropriate position permitting air under pressure to flow from the reservoir 2 through the straight air pipe and port 21 of the application valve device 13 to the chamber 52 through ports 59, chamber 53, port 56 and brake pipe 57 to the brake cylinder 3. The valve 63 of the release valve device 14 will be in its illustrated or closed position thus maintaining the pressure within the brake cylinder 3. This application of pressure to the pipe 21 causes the pneumatic switch device 19 to close a circuit through the field winding of the tachometer generator 16 as above traced, thus causing the generator 16 to operate the slide valve mechanism 15 in accordance with the voltage of the generator, or, in accordance with the speed of the vehicle. If the brake application was made while the vehicle is traveling at a high rate of speed the winding 37 of the slide valve mechanism will be energized to a considerable extent moving the plunger 44 to the left to engage the stops 51 and causing the valve 46 to entirely close the port 48.

Should the pressure in the brake cylinder 3 be above that desired, the pendulum 11 of the retardation controller 9 will swing toward the left to cause engagement of the contact member 12, carried by the pendulum, with contact member 71, thus closing a circuit from the battery 72, that is grounded at the point 73, through conductor 74, contact members 12 and 71, conductor 75 and winding 58 of the device 13, conductor 76 to ground at 77. Closing the above traced circuit causes the winding 58 to operate the application valve 54 downwardly to close the port 59 and prevent further passage of air from the reservoir 2 to the brake cylinder 3. Further operation of the pendulum 11 toward the left, occasioned by too great a deceleration of the vehicle, causes engagement of contact members 12 and 78, closing a circuit from the battery 72 through conductor 74, conductor 79, winding 67 of the release magnet valve control mechanism, conductor 81 to ground at 82. Closing the above traced circuit causes energization of the winding 67 to operate the release valve 63 downwardly thus permitting air to flow from the brake cylinder 3 through brake cylinder pipe 57, port 62, chamber 61, port 65, chamber 66 and pipe 83 to the chamber 50 in the slide valve mechanism 15, and through the small by-pass 49 to the atmosphere. A slow release of the pressure in the brake cylinder 3 is thus permitted.

As the degree of application of the brakes is thus retarded the pendulum 11 will move slightly toward the right thus separating the contact member 12 from engagement with the contact members 71 and 78. The windings 58 and 67 of the application magnet control valve 13 and the release magnet control valve 14, respectively, are thus deenergized permitting upward movement of the valves 54 and 63 to their illustrated positions thus again connecting the pipe 21 to the pipe 57 to maintain the pressure in the brake cylinder 3.

As the vehicle continues to slow down the increasing coefficient of friction between the brake shoe and the wheels will cause an increasing rate of deceleration of the vehicle thus causing the pendulum 11 to again swing toward the left and close the valve 54 in the application valve device 13 and open the valve 63 in the release valve device 14. Since the speed of the vehicle is being reduced the energization of the winding 37 is correspondingly reduced thus permitting the core 44 and the slide valve 46 to be moved toward the right an amount sufficient that the pull of the winding 37 on the core 44 will just balance the pressure of the spring 45. This will partially open the passage through the port 48 and permit a more rapid release of the brake pressure.

The motorman may control the release of the brakes by brake valve 1 at all times except when the valve 54 is closed at which time the release is being controlled only by the retardation controller 9 through the release valve device 14 and the slide valve device 15. As soon as this releasing action becomes sufficient to cause the interruption of the circuit controlled by the retardation controller 9, complete release of the brakes may be completed through the brake valve 1 in the usual way.

While a preferred embodiment of the invention has been illustrated and described it will be appreciated that many modifications thereof within the spirit of my invention will occur to those skilled in the art and I do not wish to be limited otherwise than by the scope of the appended claims.

Having now described my invention, what I claim as new and desire to secure by Letters Patent, is:

1. In combination, a fluid pressure brake for vehicles, a brake valve for effecting manual control of said brake, retardation control means responsive to the deceleration of the vehicle, an application valve and a release valve controlled thereby during application of said brake for controlling the effective braking force, and means actuated in accordance with the speed of the vehicle for varying the permissible rate of release that may be effected through said release valve.

2. In combination, a fluid pressure brake for vehicles, a brake valve for effecting manual control of said brake, retardation control means responsive to the deceleration of the vehicle, an application valve and a release valve controlled thereby during application of said brake for controlling the effective braking force, a pressure release limiting valve in series with said release valve, and means responsive to the speed of the vehicle for actuating said release limiting valve to provide a smaller outlet port upon an increase in speed of the vehicle.

3. In combination, a fluid pressure brake for vehicles, a brake valve for effecting manual control of said brake, retardation control means responsive to the deceleration of the vehicle, an application valve and a release valve controlled thereby during application of said brakes for controlling the effective braking force, and means for predetermining the rate of making a particular release in dependence upon the speed of the vehicle and to permit a gradually increasing rate of release as the vehicle speed decreases.

4. In combination, a fluid pressure brake for vehicles, a brake valve for effecting manual control of said brake, retardation control means responsive to the deceleration of the vehicle, an application valve and a release valve controlled thereby during application of said brake for controlling the degree of application of said brakes to maintain a predetermined deceleration of the vehicle, a pressure release limiting valve for controlling the rate of release of said brakes, and means for controlling said pressure release limiting valve in accordance with the speed of the vehicles to permit increasingly rapid rates of release as the vehicle speed decreases.

5. In a brake equipment for vehicles, in combination, braking means, means for applying the braking means, retardation means responsive to the deceleration of the vehicle for controlling the degree of application and release of said braking means to limit the rate of retardation effected by said braking means, valve means for limiting the rate of release of said braking means, and means effective upon application of said braking means for operating said valve means in accordance with the speed of the vehicle to permit increasingly rapid rates of release as the vehicle speed decreases.

6. In a brake equipment for vehicles, in combination, a fluid pressure brake, means for applying the brake, retardation control means responsive to the deceleration of the vehicle for controlling the degree of application and release of said brakes to limit the rate of retardation effected by said brake, valve means for limiting the rate of release of said brake, electroresponsive means energized upon application of said brake for operating said valve means in accordance with the speed of the vehicle to permit increasingly rapid rates of release as the vehicle speed decreases.

7. In a brake equipment for vehicles, in combination, a fluid pressure brake, means for applying the brake, retardation control means responsive to the deceleration of the vehicle for controlling the degree of application and release of said brakes to limit the rate of retardation effected by said brake, an electromagnetically operated pressure release limiting valve for controlling the rate of release of said brake, a tachometer generator operated in accordance with the speed of the vehicle for controlling said valve, and a pneumatic switch operative to effect the energization of the field winding of said tachometer generator upon application of said brakes.

8. In a brake equipment for vehicles, in combination, a brake cylinder, means for supplying fluid under pressure to said brake cylinder for applying the brakes, a retardation controller for controlling the release of fluid under pressure from said brake cylinder for effecting a predetermined rate of retardation of the vehicle, and means responsive to the speed of the vehicle for progressively increasing the permitted rate of said release of fluid under pressure during the deceleration of the vehicle.

SIDNEY G. DOWN.